Jan. 29, 1952 B. M. GADDIS 2,583,560
COMBINATION DUSTING AND SPRAYING MACHINE
Filed May 23, 1946 6 Sheets-Sheet 1
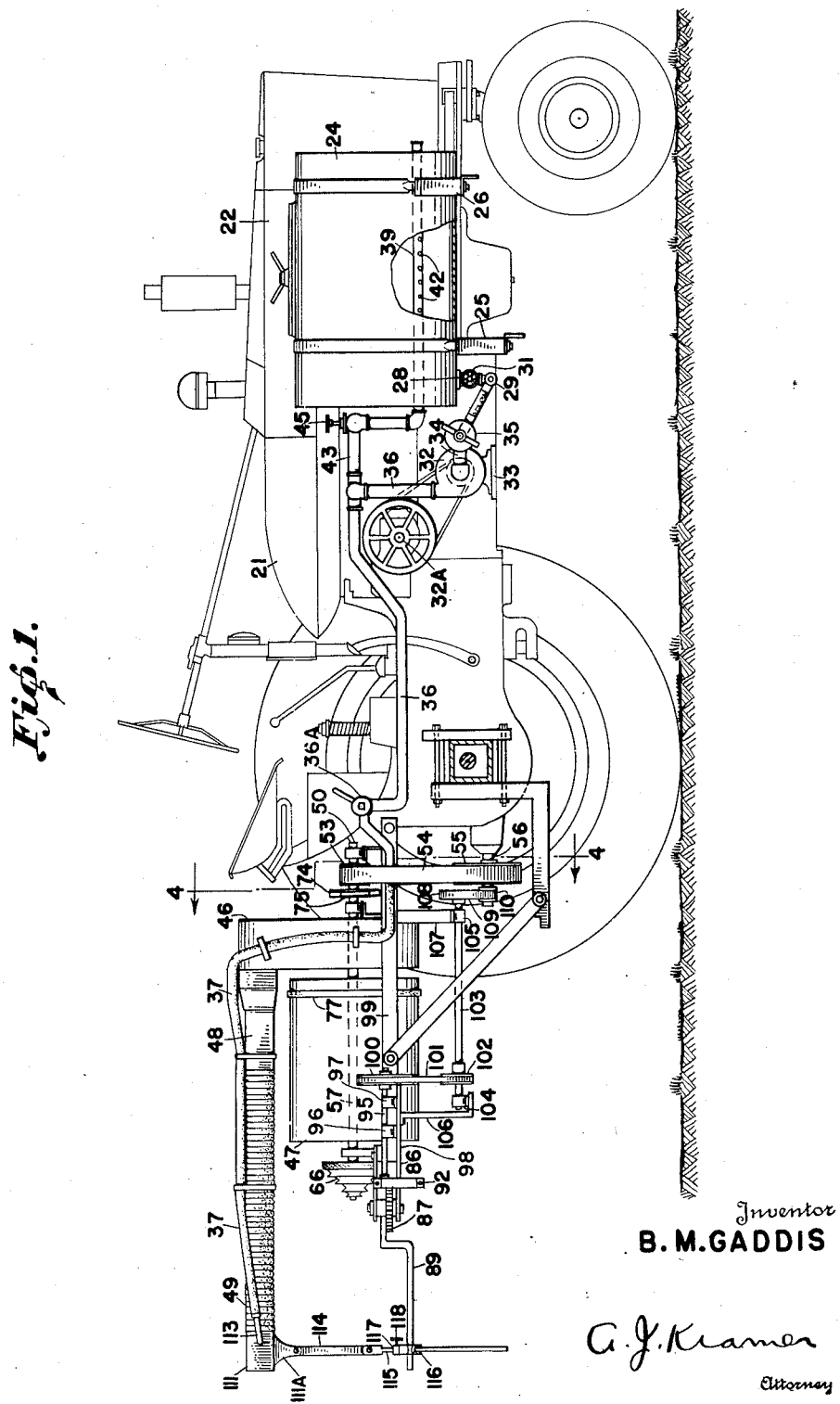
Fig.1.
Inventor
B. M. GADDIS
Attorney Jan. 29, 1952  B. M. GADDIS  2,583,560
COMBINATION DUSTING AND SPRAYING MACHINE
Filed May 23, 1946  6 Sheets-Sheet 3

Inventor
B. M. GADDIS
By G. J. Kramer
Attorney

Jan. 29, 1952 B. M. GADDIS 2,583,560
COMBINATION DUSTING AND SPRAYING MACHINE
Filed May 23, 1946 6 Sheets-Sheet 4
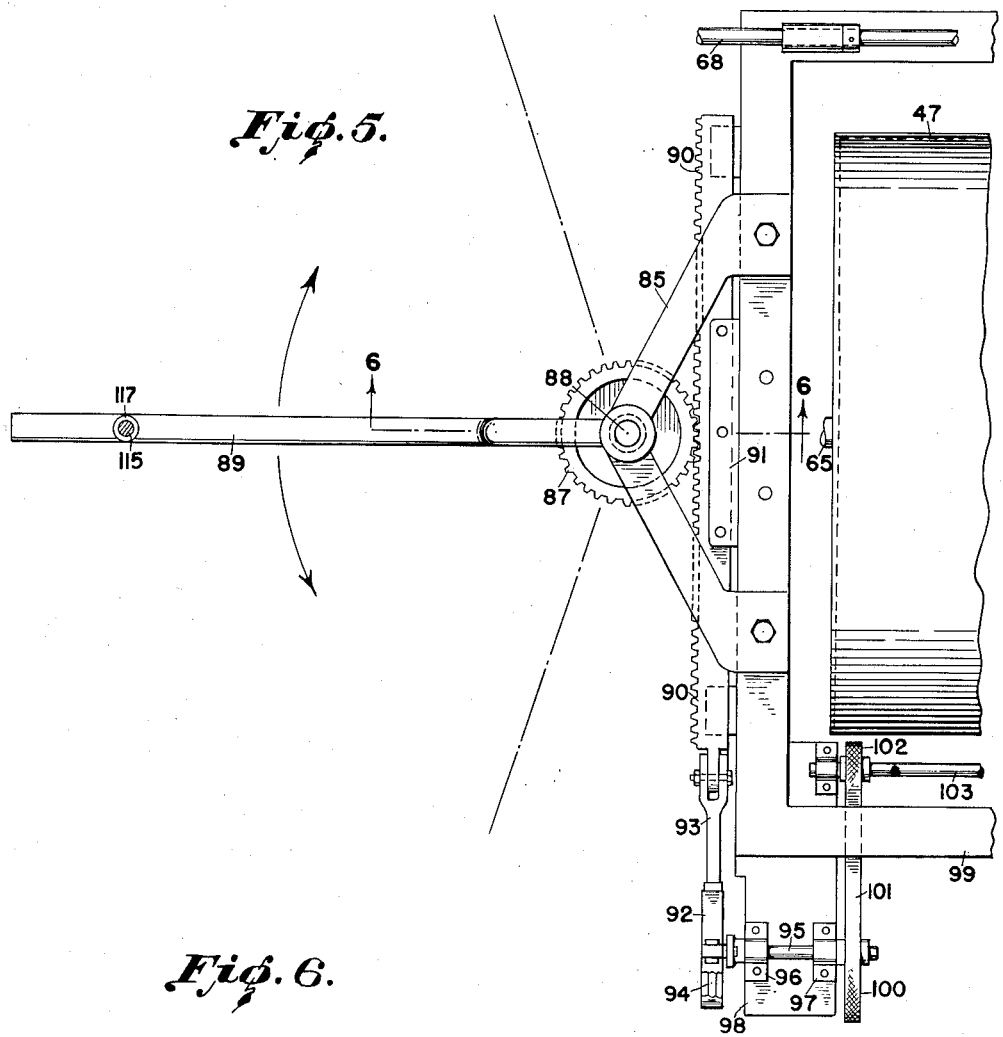
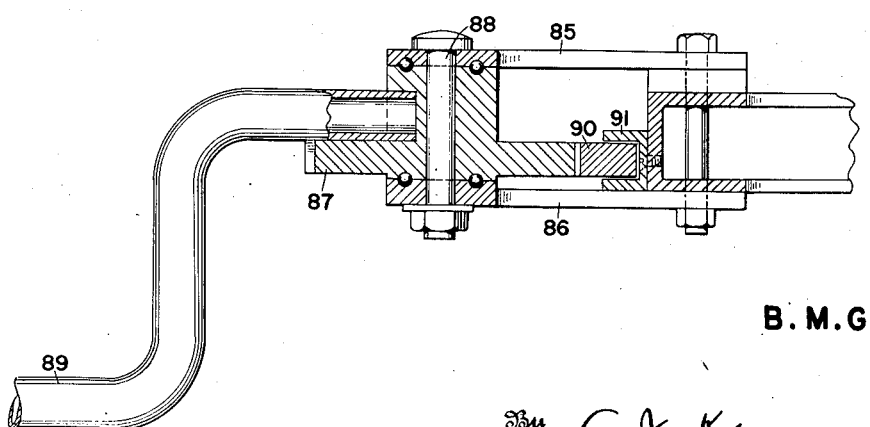
Inventor
B. M. GADDIS
By C. J. Kramer
Attorney Jan. 29, 1952     B. M. GADDIS     2,583,560
COMBINATION DUSTING AND SPRAYING MACHINE
Filed May 23, 1946     6 Sheets-Sheet 5
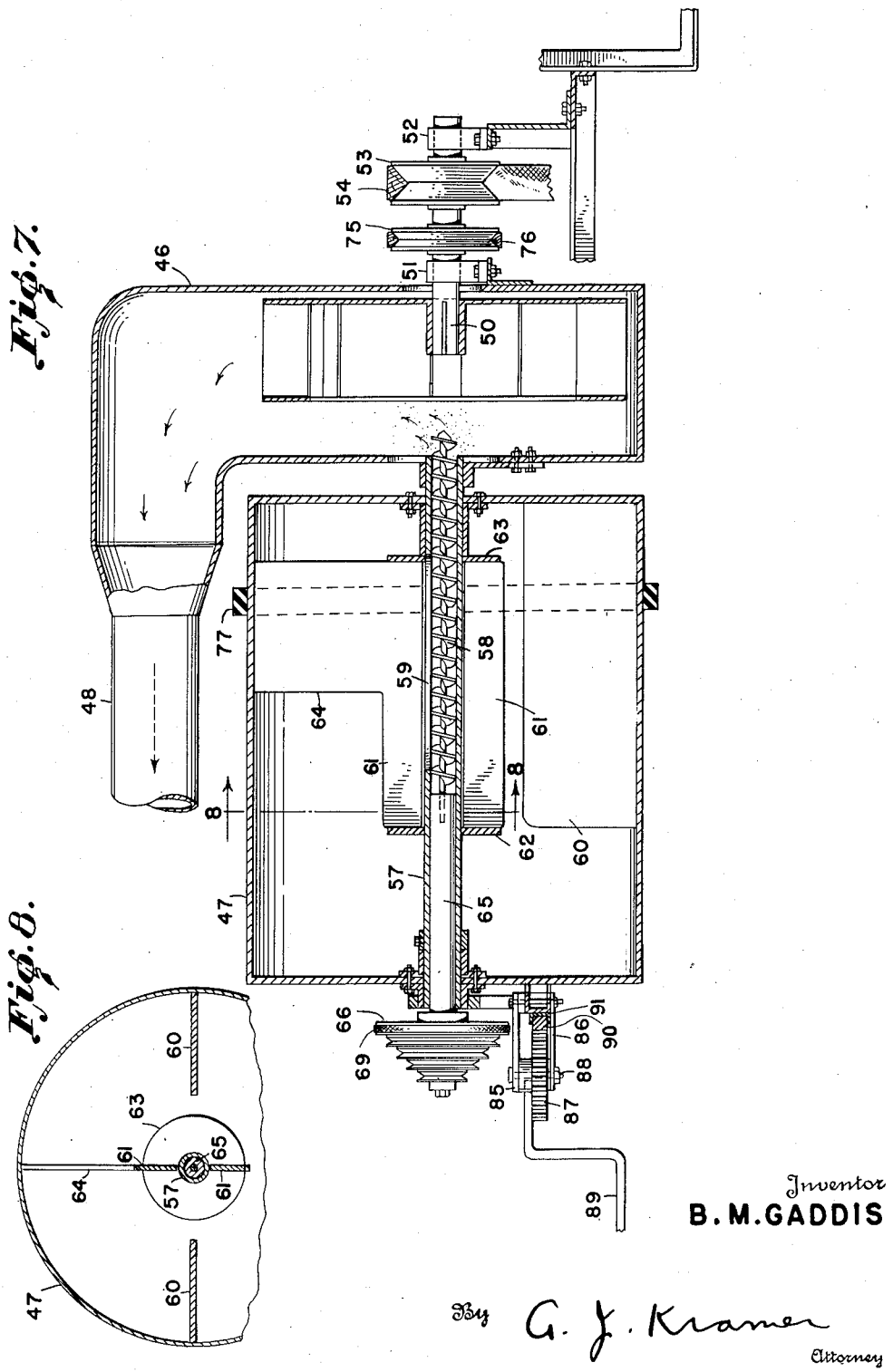
Inventor
B. M. GADDIS
By G. J. Kramer
Attorney Jan. 29, 1952   B. M. GADDIS   2,583,560
COMBINATION DUSTING AND SPRAYING MACHINE
Filed May 23, 1946   6 Sheets-Sheet 6

Inventor
B. M. GADDIS
By A. J. Kramer
Attorney

Patented Jan. 29, 1952

2,583,560

UNITED STATES PATENT OFFICE 2,583,560

COMBINATION DUSTING AND SPRAYING MACHINE

Bevy M. Gaddis, Washington, D. C.; dedicated to the free use of the People in the territory of the United States Application May 23, 1946, Serial No. 671,716

2 Claims. (Cl. 299—62)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

This invention relates to devices for dispersing finely divided materials and is more particularly concerned with such a device which can be used to apply such materials to large agricultural areas.

One of the objects of this invention is the provision of a machine of the type mentioned which can be used to apply insecticides, fungicides, plant growth substances, such as plant regulants, herbicides, seeds, and other materials in the form of sprays and dusts, either simultaneously or separately.

Another object of this invention is the provision of such a machine which can be used to apply simultaneously more than one type of material.

A further object of this invention is the provision of such a machine which has a large capacity and which can be used to cover large areas in a very short time.

A still further object of this invention is the provision of a machine of the type mentioned which, in conjunction with a tractor, can be used to discharge the material or materials at any point from one side of the tractor to the other and can also be used to discharge the material or materials uniformly across a swath much greater than the width of the tractor.

A still further objective is to permit the use of the machine on vegetation of various heights, such as from the ground to the top of trees.

Other objects and advantages of this invention will be apparent from the following description considered together with the accompanying drawing illustrating a preferred embodiment of the invention with various modifications thereof.

In the drawing:

Figure 1 is a side elevational view of a tractor showing an embodiment of my invention attached thereto with some parts broken away.

Figure 5 is a detailed plan view of the oscillating mechanism.

Figure 6 is a section along the line 6—6 of Figure 5.

Figure 7 is a longitudinal section through the dust drum and air blower.

Figure 8 is a partial section along the line 8—8 of Figure 7.

Figure 2:
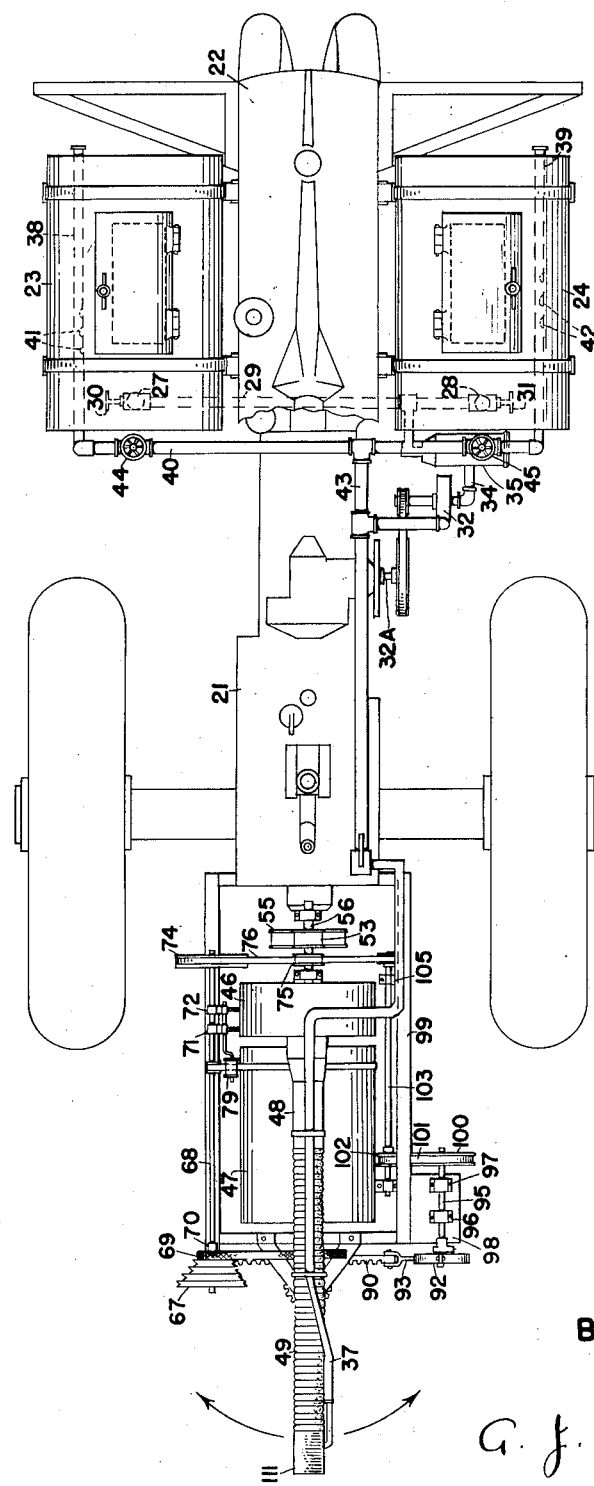
Figure 2 is a plan view of the same embodiment.
Figure 3:
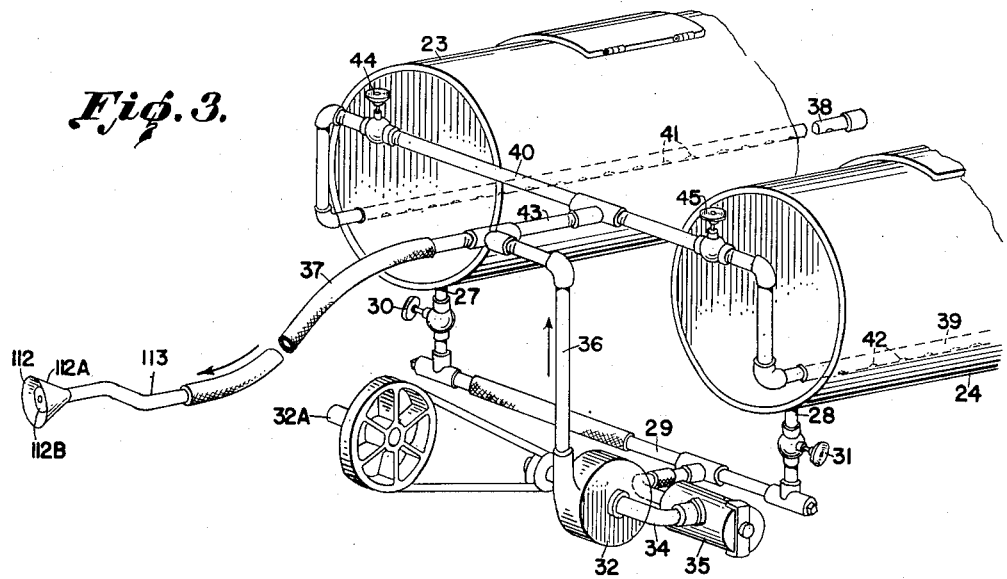
Figure 3 is a three-dimensional view of the tanks and piping system apart from the other elements of the embodiment.
Figure 4:
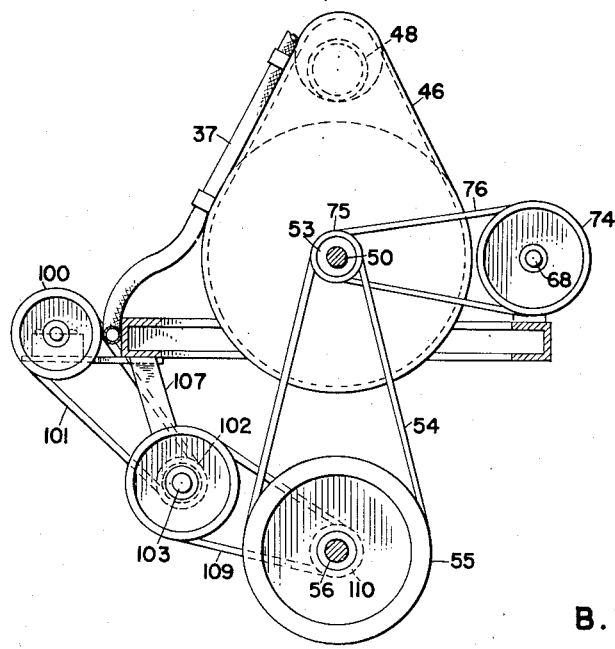
Figure 4 is a section along the line 4—4 of Figure 1.
Figure 9:
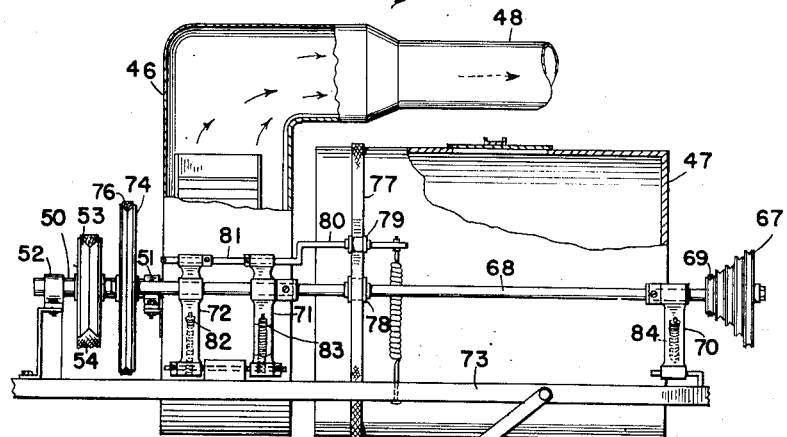
Figure 9 is an elevational view, with parts broken away, of the side opposite that of Figure 1 showing the means for revolving the dust drum.

Referring with more particularity to Figures 1 to 9 of the drawing, in which like numerals designate like parts, the invention is associated with an ordinary tractor 21 having a motor 22 at the front. At the front of the tractor, tanks 23 and 24 are secured on brackets 25 and 26, respectively, said brackets being secured to the frame of the tractor. At the bottom of each tank an outlet pipe 27 and 28, respectively, is connected, which pipes are connected together with a transverse pipe 29. The outlet pipes 27 and 28 are provided with valves 30 and 31.

There is mounted on the tractor a pump such as the centrifugal pump 32 on a bracket 33, driven by the side power take-off 32A of the tractor, the inlet 34 of which is connected to the transverse pipe 29 through a strainer 35. The outlet of the pump 32 is connected to a pipe 36 which extends to the rear of the tractor where it is connected to a flexible liquid hose 37. A hand-operated control valve 36A is connected in the pipe line 36 near the driver's seat.

Within each of the tanks 23 and 24, there is secured, at a point near the bottom, a longitudinal pipe 38 and 39, respectively. The forward ends of said pipes 38 and 39 are sealed and the rearward ends are mutually connected together by means of a transverse pipe 40 on the outside of the tanks. Said pipes 38 and 39 are provided with apertures 41 and 42, respectively. The pipe 40 is connected to the pipe 36 by means of a pipe 43. Between the point of connection between pipes 43 and 40 and the pipes 38 and 39, valves 44 and 45, respectively, are provided in the pipe 40. By these means liquid is withdrawn from the tanks 23 and 24 and discharged into the hose 37, a small part being re-cycled into the tanks through the transverse pipe 40 and longitudinal pipes 38 and 39.

On the rear of the tractor there is mounted a duster of any suitable type having an air blower 46 and a rotatable dust drum 47, said drum being provided with any suitable means for metering or discharging dust therein into the blower. The outlet of the blower is disposed at the top and is connected to a rearwardly extending pipe 48 to which is attached a flexible air hose 49. The fan of the blower is secured to a shaft 50 journaled in bearings 51 and 52. Between these bearings a pulley 53 is secured which is connected by a belt 54 to another pulley 55 on a power take-off 56 of the motor.

The drum 47 is mounted on a stationary hollow shaft 57 within which shaft there is disposed a screw conveyer 58. The rearward part of the shaft 57 has a cut-out section 59 into which dust feeds as the drum 47 rotates. The dust is directed to this point by means of vanes 60, which are secured to the inner wall of the drum. The dust is distributed over the cut-out portion 59 by means of rotatable blades 61 which are longitudinally disposed adjacent to the shaft 57 and are held together by rings 62 and 63. These rings are attached to the stationary hollow shaft 57 in which shaft 65, also hollow, turns. The blades 61 are secured to the drum by means of an arm 64 projecting from the inner wall of the drum.

The screw 58 is secured to the end of shaft 65 which projects outwardly from the rear of the drum and is attached to a cone of pulleys 66. A corresponding cone of pulleys 67 is mounted on a longitudinal shaft 68 on the side of the drum 47. The pulleys 66 and 67 are connected with a belt 69. Said shaft 68 is rotatably mounted in bearings on arms 70, 71, and 72; said arms being hingedly mounted to a frame member 73. The other end of the shaft 68 is secured to a pulley 74 which is driven by another pulley 75 on the shaft 50, by means of a belt 76.

The drum 47 is rotated by a belt 77 which belt is driven by a pulley 78 on the shaft 68. The belt 77, however, is normally loose about the pulley 78 and drum 47 and is set in motion by means of an idler pulley or belt tightener 79, mounted on the crank arm 80 of a shaft 81 above the shaft 68 on the arms 71 and 72. The belts 76 and 69 are tensioned by means of springs 82, 83 and 84, between the arms 70, 71 and 72, respectively, and the frame.

At the rear of the tractor, there is rotatably mounted on brackets 85 and 86 a pinion 87 in a horizontal plane on a vertical shaft 88. There is radially connected to the pinion 87 one end of a rearwardly projecting arm 89. The pinion 87 meshes with a rack 90 slidably mounted on the bracket 86 in a channel member 91. The rack 90 is connected to an eccentric strap 92 by means of the eccentric rod 93. The eccentric strap 92 is driven by an eccentric sheave 94 on the end of a shaft 95. The shaft 95 is rotatably mounted in bearings 96 and 97 on a bracket 98 secured to a frame member 99. The other end of the shaft 95 is secured to a pulley 100 which is connected by a belt 101 to a pulley 102 on a longitudinal shaft 103. The shaft 103 is rotatably mounted in bearings 104 and 105 which are secured to brackets 106 and 107 depending from the frame member 99. The forward end of the shaft 103 carries a pulley 108 which is connected by a belt 109 to a pulley 110 on the power take-off shaft 56.

The rearward end of the hose 49 is provided with a spray nozzle which is composed of an air nozzle 111 at the center of which there is disposed a liquid spray nozzle 112 having an outwardly diverging flange 112A and a concave or recessed face 112B. This shape of the liquid spray nozzle creates a suction effect at its outlet when high velocity air flows around it resulting in atomization of the liquid. The liquid spray nozzle is attached to the end of a tube 113. The tube 113 is bent at right angles and passes through the wall of the air nozzle 111 where it is rigidly secured to the air nozzle by any suitable means, such as welding. The other end of the tube 113 on the outside of the air nozzle 111 is connected to the hose 37.

The air nozzle 111 is adjustably supported on the arm 89 by any suitable means permitting transverse oscillation. The means illustrated comprises a link 114, the upper end of which is hinged to a vertical bracket 111A secured to the air nozzle 111 and the lower end to a vertical bar 115, the latter being slidably mounted at the outer end of the arm 89 in a boss 116. Above the boss 116, there is slidably disposed around the bar 115 a collar 117, which collar is provided with a set screw 118 to lock it in position. By these means the upper end of the bar 115 may be vertically adjusted on the arm 89.

The machine may be operated in any one of a number of different ways depending upon the type of material or materials desired to be dispersed. In this connection, it should be noted that materials in dust form may be dispersed alone, liquid spray materials may be dispersed alone or both dust materials and liquid spray materials may be dispersed simultaneously.

In dispersing liquid sprays, the material to be dispersed is disposed in one or both of the tanks 23 and 24, and this may be in the form of a solution, suspension, emulsion or other liquid form. Also, a material may be placed in one of the tanks different from the material in the other for simultaneous or alternate dispersion. This is particularly desirable in cases of incompatible materials, particularly materials which are compatible only when in contact with each other for short periods of time, such as certain insecticides and fungicides. The materials in the tanks are withdrawn therefrom by means of the pump 32 and delivered through the pipe 36, hose 37, tube 113 to the nozzle 112 where they emerge.

The pressure forcing the liquid to the liquid spray nozzle is of a low magnitude and should be just enough to force the liquid out of the nozzle without atomizing it in any way. In this connection, it should be noted that atomization is not affected by the liquid spray nozzle by virtue of the pressure of the liquid but rather by virtue of the air flowing around the nozzle. This air is delivered through the hose 49 from the outlet pipe 48 of the blower. In order to effect a satisfactory spray, it is preferred that the contour of the liquid spray nozzle be such that a partial vacuum is created at the outlet point of the nozzle 112. This may be done by various means, one of which is to provide the liquid spray nozzle with the flared or conical shaped flange 112A and the recessed or concave face 112B. In order to obtain a satisfactory spray, it is necessary for the air velocity to be extremely high. In practice it was found that this should be not less than about 160 miles per hour. Also, the liquid pressure must be low and, as stated above, should be not substantially more than what is required to just force the liquid out of the nozzle 112.

Figure 10:
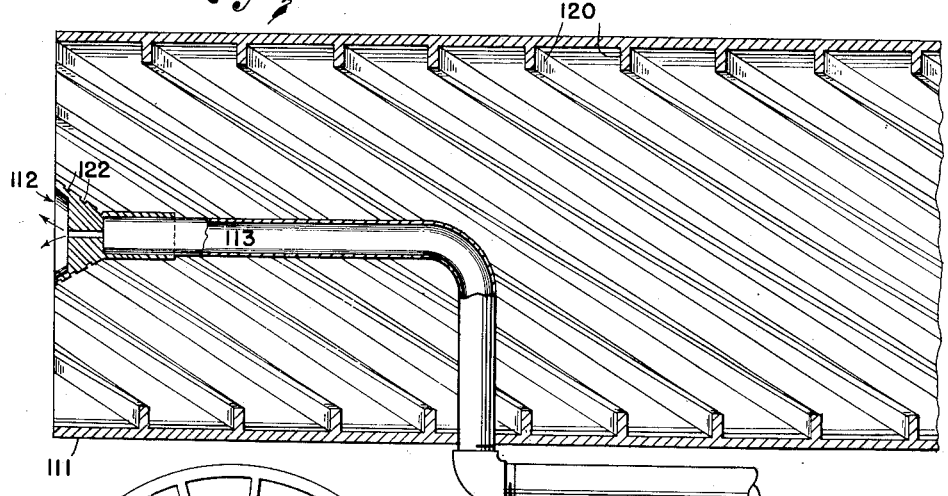
Figure 10 is a section on line 10—10 of Fig. 11 of a modified form of the combined liquid spray and air nozzle.
Figure 11:
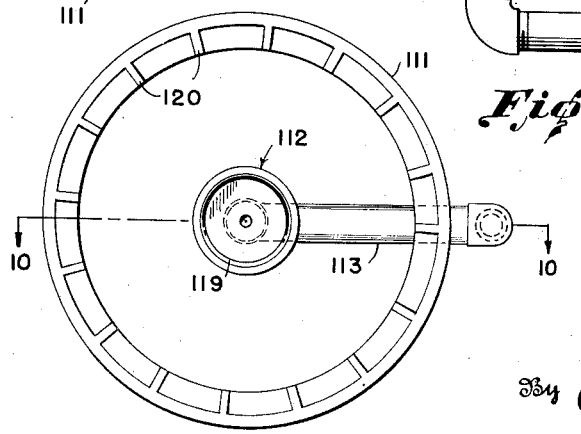
Figure 11 is an end elevational view of the modification shown in Figure 10.

If the liquid pressure is high a correspondingly higher air velocity is needed, but even under such circumstances a satisfactory spray is not obtained as when using extremely low liquid pressures. Various spray characteristics may be provided by employing modifications in the liquid spray nozzle and the air nozzle. For example, where a penetrating effect is desired, such as where trees having a heavy foliage are to be sprayed, it is possible to increase the depth of penetration by diagonally corrugating the inner wall of the air nozzle 111 or providing it with fins 120, such as illustrated in Figures 10 and 11. To assist this action, the outer conical surface of the liquid spray nozzle may also be provided with rifling or grooves 112 in the same general direction as the corrugations or fins 120. However, by reversing the direction of the rifling or grooves on the liquid spray nozzle, it is possible to create a greater turbulence effect at the discharge end which is often desired for certain types of dispersion.

A part of the liquid leaving the pump 32 is returned through the pipes 43 and 40, and 38 and 39 into the tanks through the apertures 41 and 42. This results in agitation of the liquid in the tank which is beneficial in cases where materials which settle rapidly are used, such as suspensions, emulsions, and so forth. However, where such materials are not used, such agitation is not necessary, under which circumstances the valves 44 and 45 are closed. It is to be understood that other agitating means, such as mechanical agitators, may be used instead of or in conjunction with these hydraulic means.

Concomitant with the delivery of the material from the spray nozzle 112, the arm 89 is oscillated back and forth by means of the rack and pinion 90 and 87, said rack being reciprocated by means of the eccentric driven by the shaft 95 which gets its power from the power take-off 56 by the means previously described.

When it is desired to use the machine for dispersing materials in dust form, the belt 77 is tightened with the idler 79, and the drum 47 is thus caused to rotate. This has the effect of delivering dust material in the drum around the cut-out section 59 from which it is withdrawn by the conveyor screw 58 to the inlet of the blower 46 from whence it is carried through the blower and discharged into the hose 49. By closing the valves 30 and 31, the liquid is held in the tanks 23 and 24, thereby permitting the machine to discharge dust only. However, by turning on the valves 30 and 31, both the dust material and the liquid spray may discharge simultaneously.

Having thus described my invention, I claim:

1. An insecticide spraying device having a flexible hose and a spray nozzle at the free end thereof, in combination with a vertical support for said free end of said hose, a horizontal arm, said vertical support being connected for vertical adjustment to one end of said arm, a horizontal pinion secured to the other end of said arm, said pinion being rotatably mounted on a stationary pivot, a rack mounted for reciprocation and engaging said pinion, and means for reciprocating said rack, whereby as the rack is reciprocated a horizontally oscillating motion is automatically imparted to said support and nozzle about said pivot.

2. An insecticide spraying device having a flexible hose and a spray nozzle at the free end thereof, in combination with a vertical support for said free end of said hose, a horizontal arm, said vertical support being connected for vertical adjustment to one end of said arm, a horizontal pinion secured to the other end of said arm, said pinion being rotatably mounted on a stationary pivot, a rack mounted for reciprocation and engaging said pinion, an eccentric, a connecting link between said eccentric and said rack, and means for revolving said eccentric, whereby as the said eccentric is revolved a horizontally oscillating motion is automatically imparted to said support and nozzle about said pivot.

BEVY M. GADDIS.

REFERENCES CITED

The following references are of record in the file of this patent:

UNITED STATES PATENTS

| Number | Name | Date |
|---|---|---|
| 634,524 | Franklin | Oct. 10, 1899 |
| 716,459 | Muller | Dec. 23, 1902 |
| 813,254 | Sweeney | Feb. 20, 1906 |
| 950,916 | Hayes | Mar. 1, 1910 |
| 1,005,822 | Ford | Oct. 17, 1911 |
| 1,374,551 | Clarke | Apr. 12, 1921 |
| 1,495,098 | Nelson | May 20, 1924 |
| 1,785,932 | Brown et al. | Dec. 23, 1930 |
| 1,846,938 | Benjamin | Feb. 23, 1932 |
| 2,062,294 | Cary et al. | Dec. 1, 1936 |
| 2,210,846 | Aghnides | Aug. 6, 1940 |
| 2,329,331 | Brosmer | Sept. 14, 1943 |
| 2,365,755 | Griffith | Dec. 26, 1944 |
| 2,453,368 | Goodwin | Nov. 9, 1948 |

FOREIGN PATENTS

| Number | Country | Date |
|---|---|---|
| 225,094 | Great Britain | Nov. 27, 1924 |
| 470,166 | Germany | Dec. 20, 1928 |
| 602,019 | Germany | Aug. 16, 1934 |